UNITED STATES PATENT OFFICE.

VICTOR G. BLOEDE, OF CATONSVILLE, MARYLAND, ASSIGNOR TO THE VICTOR G. BLOEDE COMPANY OF BALTIMORE CITY.

MANUFACTURE OF STARCH GUM.

SPECIFICATION forming part of Letters Patent No. 536,260, dated March 26, 1895.

Application filed March 3, 1893. Serial No. 464,550. (No specimens.)

*To all whom it may concern:*

Be it known that I, VICTOR G. BLOEDE, a citizen of the United States, residing at Catonsville, in the county of Baltimore and State of Maryland, have invented certain new and useful Improvements in the Manufacture of Starch Gums; and I do hereby declare that the following is a full, clear, and exact description of the invention, which will enable others skilled in the art to which it appertains to make and use the same.

In the processes now in use for the manufacture of dextrine and starch gums the starch is treated with a mineral acid of some kind prior to its torrefication.

My improved process is based upon the substitution for the free acid of a salt of any mineral acid of such a character that the application of heat will dissociate the compound, the acid being liberated from the base and being thereby brought in contact with the starch in a nascent state. Among the salts available for this purpose may be named, chloride of magnesium, chloride of calcium, sulphate of alumina, nitrate of calcium and other similar salts of weak basicity, or a mixture of nitrates, chlorides or sulphates, may be used providing they are readily decomposible at a low heat or react upon each other so as to produce a free acid.

To carry out my process in practice, I select a salt of the chemical characteristic above described (giving preference for the ordinary purposes, to chloride of magnesium or calcium) and combine it with the starch to be converted into gum in proportion varying from one half per cent. to five per cent. or more, according to the use to be made of the resulting product, and the qualities desired in it. The smaller the percentage, the heavier the body will be of the resulting gum but the more incomplete the conversion into dextrine, while by the use of a large percentage the gum will be much more soluble, but of greatly reduced body. If the salt used is capable of being powdered it may be mixed with the starch in the dry state, but it is generally preferable to sprinkle it upon the starch in the form of a solution, thereby insuring a more uniform and intimate contact, and a correspondingly better conversion.

To make a good quality of starch gum I use about the following proportions: starch, one thousand pounds; chloride of magnesium, thirty pounds; water, fifty to one hundred pounds. I dissolve the magnesium in the water and sprinkle it upon the starch as uniformly as possible, then mix thoroughly and preferably grind the entire mass. This composition is then dried and roasted in the manner well known to those practicing the art, to the depth of shade, or degree of solubility, desired. The action of the heat applied during the process of torrefication is sufficient to decompose the chloride of magnesium, and other acid salts of weak affinity, dissociating the acid from the base, the acid immediately upon its liberation acting upon the starch, and rapidly converting it into gum.

The results from my process are superior to the product obtained by the use of a free acid, owing to the fact that the liberation of the acid in a nascent state from the salt employed, renders its action more gentle and gradual and therefore very much more thorough and uniform.

From the description I have now given it will appear that I do not confine myself to the use of any one particular salt but that either chlorides, sulphates or nitrates or combinations of these may be used according to the effect, and quality of the product desired, the only essential feature being that the salt or salts employed must be capable of entire or partial dissociation of the acid from the base, within the range of temperature usually employed in roasting or torrefaction.

Having now fully described the nature and object of my invention, what I claim, and desire to secure by Letters Patent, is—

The process herein described for the manufacture of starch gums or dextrine, consisting of combining with starch a chemical salt or salts, possessing the property of liberating free acid within the range of temperature required for torrefaction; then subjecting the mixture of starch and salt to a sufficient temperature to effect the decomposition of the salt, and the conversion of the starch into gum.

VICTOR G. BLOEDE.

Witnesses:
GERTRUDE GIBSON,
REESE M. WILEN.